United States Patent [19]
Behrens

[11] Patent Number: 5,085,096
[45] Date of Patent: Feb. 4, 1992

[54] GEARSHIFT PARK INTERLOCK SYSTEM

[75] Inventor: William L. Behrens, Lake Orion, Mich.

[73] Assignee: Chrysler Corporation, Highland Park, Mich.

[21] Appl. No.: 692,956

[22] Filed: Apr. 26, 1991

Related U.S. Application Data

[63] Continuation of Ser. No. 448,480, Dec. 11, 1989, abandoned.

[51] Int. Cl.$^5$ .............................................. G05G 9/00
[52] U.S. Cl. ........................................ 74/475; 74/477
[58] Field of Search ..................... 74/475, 477; 70/248

[56] References Cited

U.S. PATENT DOCUMENTS

| | | | |
|---|---|---|---|
| 4,249,404 | 2/1981 | Kimberlin | 74/477 |
| 4,304,112 | 12/1981 | Osborn | 74/475 |
| 4,474,085 | 10/1984 | De Vogelaere et al. | 74/475 |
| 4,513,276 | 4/1985 | Kubota et al. | 74/475 |
| 4,612,820 | 9/1986 | Behrens | 74/475 |
| 4,660,443 | 4/1987 | Simgncik | 74/475 |
| 4,936,158 | 6/1990 | Livshits et al. | 74/475 |

Primary Examiner—Allan D. Herrmann
Assistant Examiner—Julie Krolikowski
Attorney, Agent, or Firm—Edward P. Barthel

[57] ABSTRACT

A vehicle park interlock system has a gearshift selector assembly coupled with an ignition locking slider receiving mechanism. The system prohibits the vehicle gearshift from being moved from a park position without the vehicle ignition mechanism being unlocked, e.g. in an off, on or start position.

8 Claims, 7 Drawing Sheets

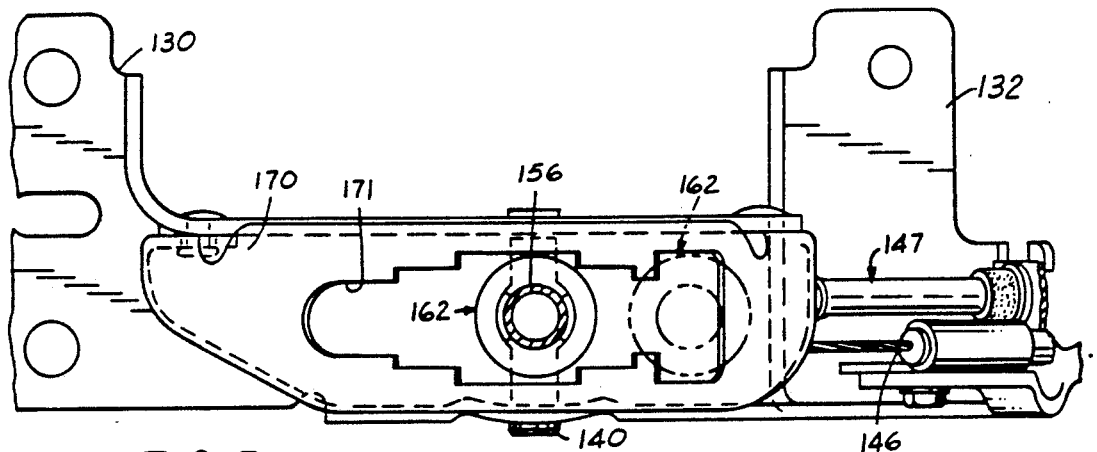
FIG.5
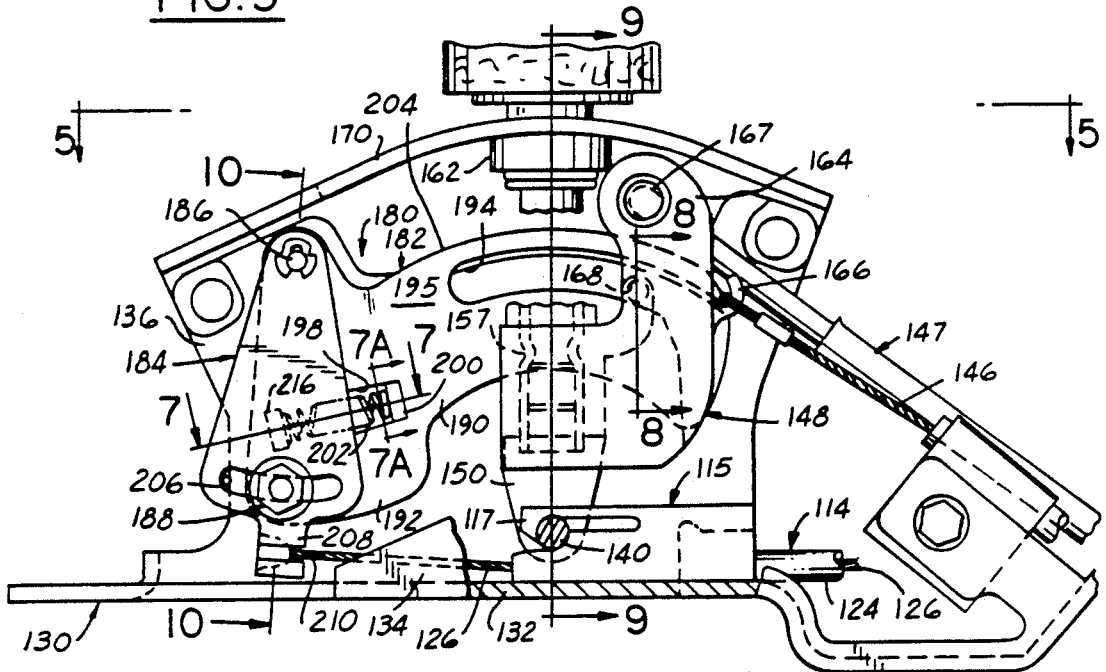
FIG.6
FIG.7
FIG.7A
FIG.8

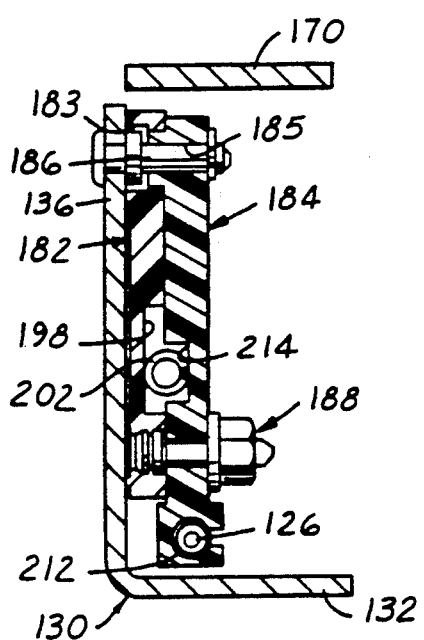
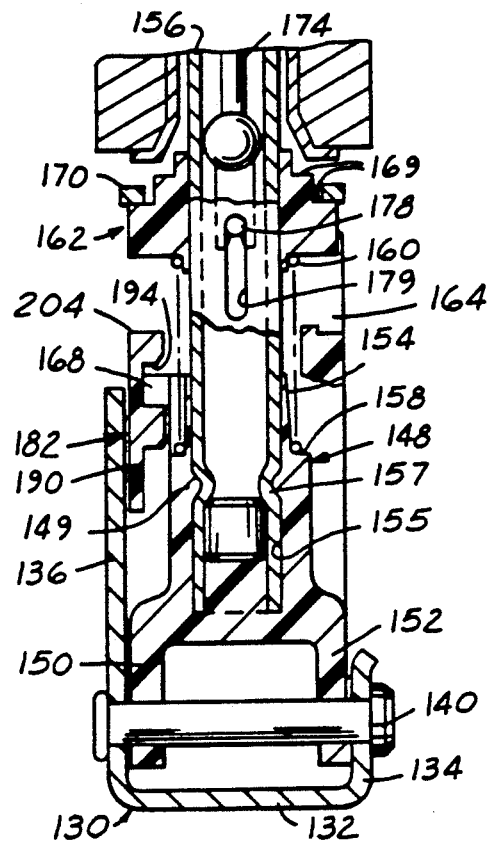
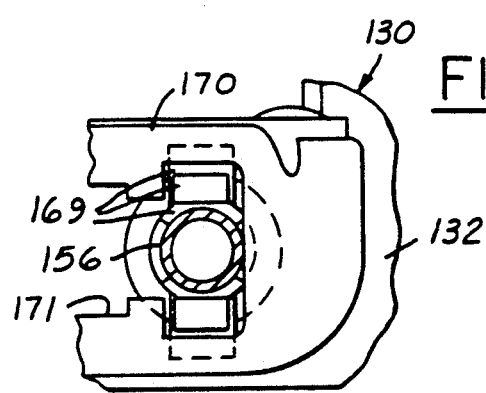

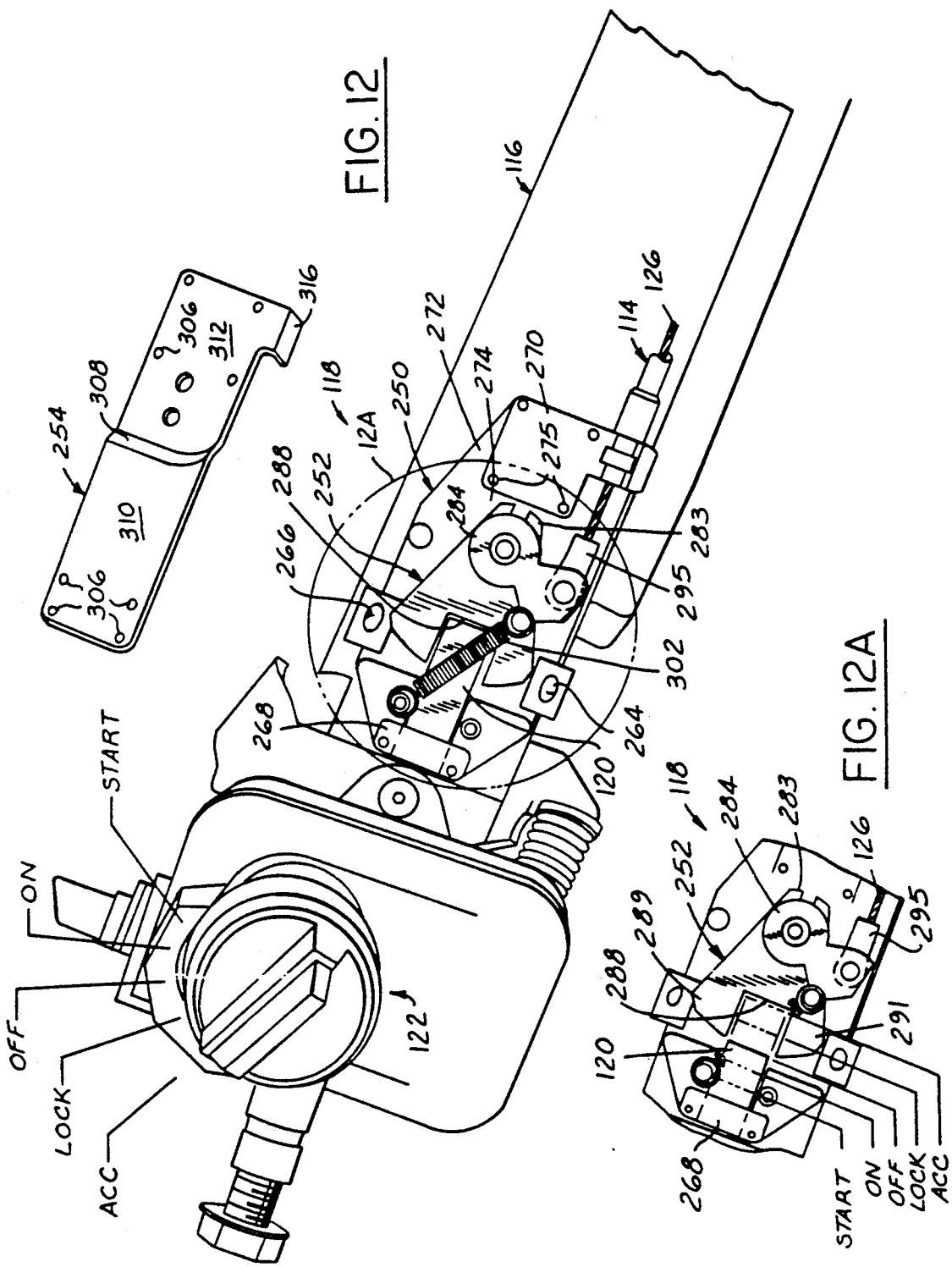

5,085,096

GEARSHIFT PARK INTERLOCK SYSTEM

This is a continuation of application Ser. No. 07/448,480, now abandoned.

BACKGROUND AND SUMMARY OF THE INVENTION

The present invention relates to vehicle transmissions and, more particularly, to a vehicle interlock system for locking the transmission in a park position when the ignition system of the vehicle is locked.

In vehicles having automatic transmissions with gearshift lever assemblies mounted on the vehicle's floor, it is desirable to have a device which is associated with the ignition system of the vehicle so that when the ignition is locked, the gearshift lever is locked in a park position. Relevant art illustrating various types of transmission shifters with park lock devices are illustrated in the following U.S. Pat. No. 4,724,722, issued Feb. 16, 1988 to Beauch et al; U.S. Pat. No. 4,712,397, issued Dec. 15, 1987 to Niskanen; U.S. Pat. No. 4,671,085, issued June 9, 1987 to Yamaguchi et al; U.S. Pat. No. 4,474,085, issued Oct. 2, 1984 to DeVogelaere et al; U.S. Pat. No. 4,304,112, issued Dec. 8, 1981 to Osborn; U.S. Pat. No. 4,270,624, issued June 2, 1981 to Jessop; and U.S. Pat. No. 4,235,123, issued Nov. 25, 1980 to Simancik et al. While the above described patents appear to perform satisfactorily, designers are always striving to improve the art.

Accordingly, it is an object of the present invention to provide the art with a new and improved gearshift park interlock system. A new and improved gearshift lever assembly is provided by the present invention. A receiving device mounted on the steering column to associate with the ignition system is also disclosed. The present invention provides the art with a relatively simple, inexpensive interlock mechanism. The gearshift lever assembly disclosed substantially eliminates lost motion. A fail safe system to indicate if the linkage is broken between the column mounted receiving device and the gearshift lever assembly is also provided by the present invention. Further, the present invention provides a gearshift lever assembly and a steering column receiving device which are readily adapted to be secured to the floor and column of the vehicle, respectively, and which are adjusted and adapted to operating conditions after positioning on the floor and column.

From the subsequent detailed description, taken in conjunction with the accompanying drawings and appended claims, other objects and advantages of the present invention will become apparent to those skilled in the art.

BRIEF DESCRIPTION OF THE DRAWINGS

FIG. 5 is a section view of the gearshift assembly with the shift lever shown in a released position with respect to the assembly, the section being taken along line 5—5 of FIG. 6.

FIG. 6 is a side elevation view of a portion of the gearshift assembly of FIG. 5 with portions thereof broken away.

FIG. 7 is a cross-section view of a portion of the gearshift assembly shown in FIG. 6, the section being taken along line 7—7 thereof.

FIG. 7A is a fragmentary vertical section view taken along the line 7A—7A of FIG. 6.

FIG. 8 is a cross-section view of a portion of the gearshift assembly shown in FIG. 6, the section being taken along line 8—8 thereof.

FIG. 9 is a cross-section view of the gearshift assembly shown in FIG. 6, the section being taken along line 9—9 thereof.

FIG. 10 is a fragmentary cross-section view of the gearshift assembly shown in FIG. 6, the section being taken along line 10—10 thereof.

FIG. 11 is a fragmentary view of a portion of the gearshift assembly similar to FIG. 5 but illustrating the shift lever in the park position.

FIG. 12 is a partially exploded perspective view of an ignition locking pin receiving device in accordance with the present invention shown in operative relationship to a column mounted ignition lock.

FIG. 12A is a view of FIG. 12 within Circle 12A with the spring removed and the pin in a plurality of positions.

DETAILED DESCRIPTION OF THE PREFERRED EMBODIMENT

Figure 1:
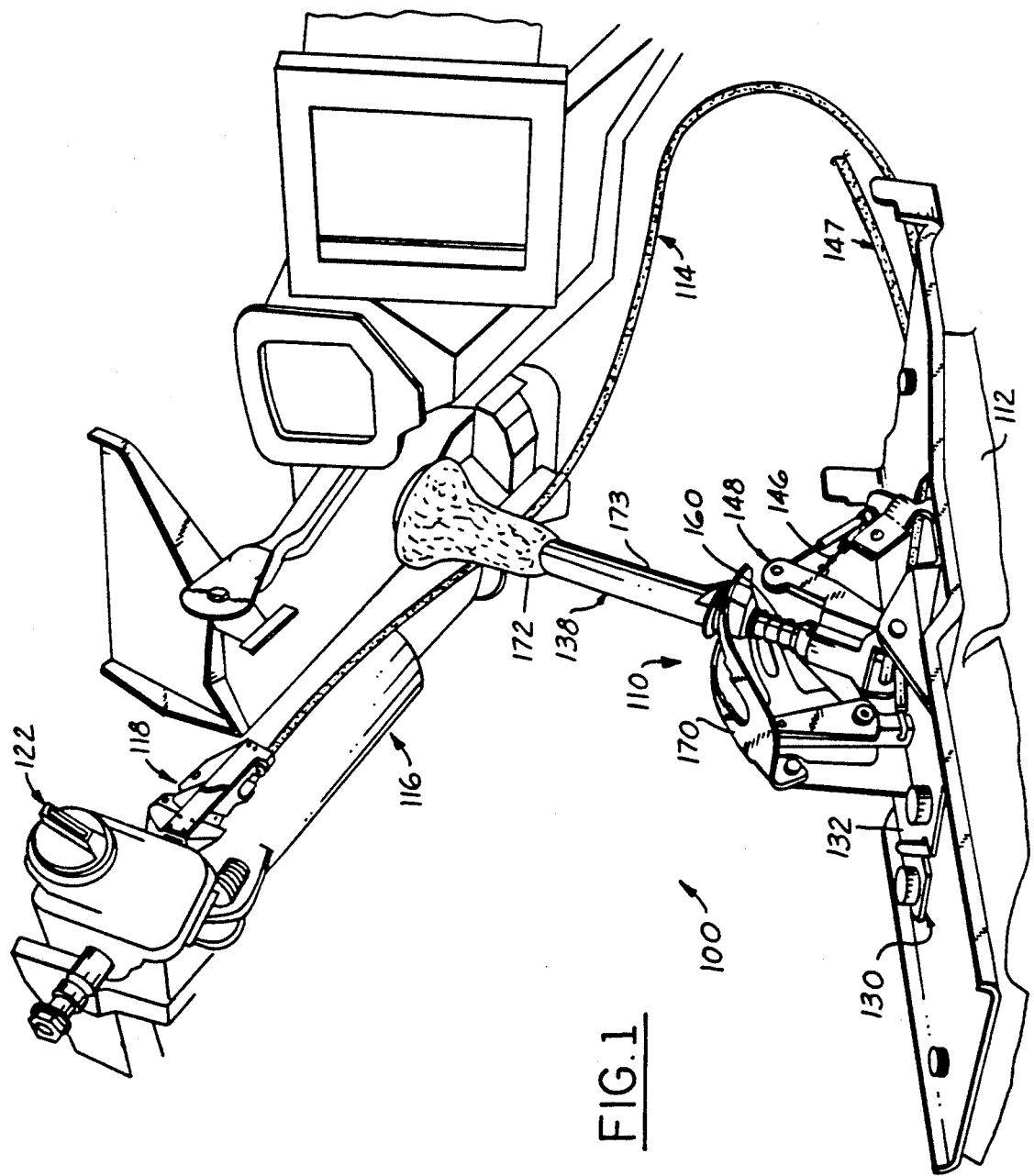
FIG. 1 is a perspective view illustrating an interlocking system in accordance with the present invention.
Figure 2:
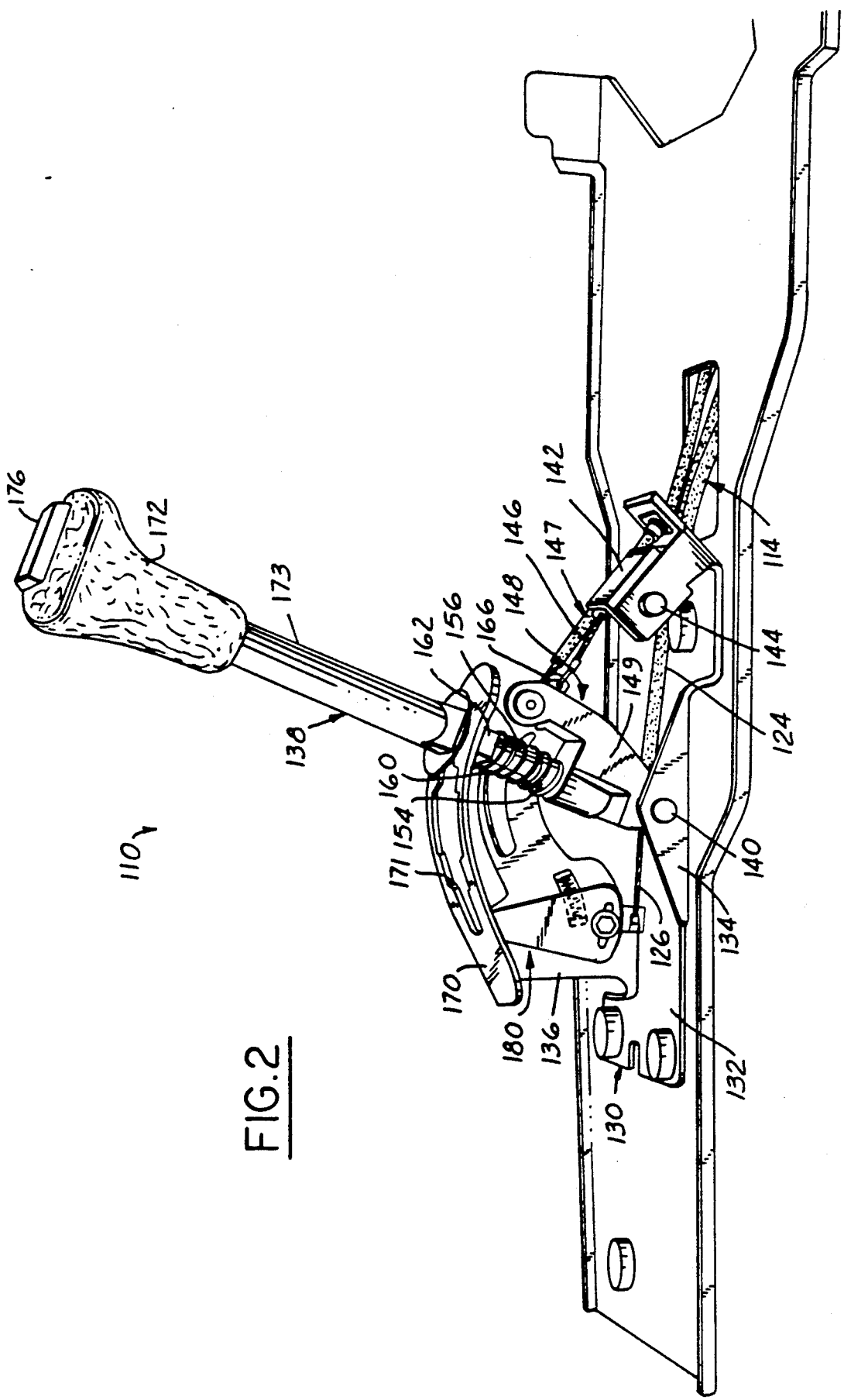
FIG. 2 is a perspective view of a gearshift assembly in accordance with the present invention.
Figure 3:
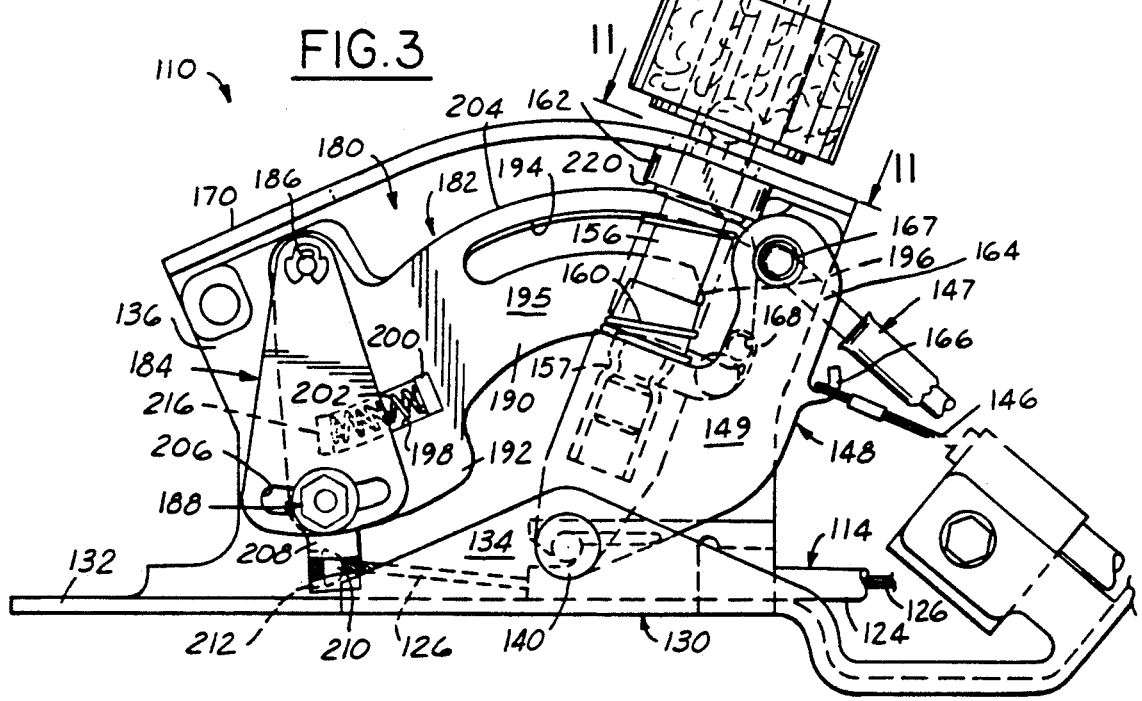
FIG. 3 illustrates a side elevation view of FIG. 2.

Referring to the figures, particularly FIGS. 1-3, a park interlock system in accordance with the present invention is illustrated in operative relationship to portions of a vehicle and is designated generally by the reference numeral 100. The park interlock system 100 includes a gearshift assembly 110 secured to the vehicle floor 112, an ignition locking pin receiving mechanism 118 and a linkage 114, such as a sheathed cable, which is connected to the gearshift assembly 110 and is routed along the vehicle floor, up the steering column 116 terminating at the mechanism 118. Mechanism 118 is designed to receive a elongated, rectangular sectioned, locking slider 120 associated with the vehicle ignition tumbler 122 to thereby lock the shift lever in a park position. The linkage 114 is generally of the type having an outer polymeric sheath 124 surrounding a braided metallic cable 126, however, several types of linkages may be utilized.

The gearshift assembly 110 includes a frame 130 having an offset base plate 132 with two parallel upstanding portions 134 and 136. The portions 134 and 136 each have holes to pivotally mount the shift lever assembly 138 by means of a transverse pin 140. The base plate 132 also includes an upstanding flange portion 142 with a threaded screw 144 or the like extending therefrom for attachment of cables 146 and 147 which, in turn, are associated with the PRNDL indicator on the console and the transmission, respectively.

As best seen with reference to FIG. 9, the lever assembly 138 includes a pivot member 148 having a body 149 with a pair of ears 150 and 152 extending therefrom. The ears 150 and 152 have apertures therethrough to enable the pin 140 to pass through the ears 150 and 152 pivotally mounting the lever assembly 138 with the transverse pin 140. The pivot member body 149 also includes a neck 154 extending therefrom positioned in substantially parallel alignment with the ears 150 and 152 on the opposite side of the body 149. The neck 154 includes a bore 155 extending into the body 149 within which the lever member 156 is disposed and suitably secured thereto. Also, a shoulder 158 is formed on the pivot member body 149 at the base of the neck 154. A compression coil spring 160 encircles the neck 154 and is retained in compression between the shoulder 158 and a detent plunger 162. A finger 164 extends from the pivot member body 149. The finger 164 includes a hook 166 which enables securement of cable 146 which is associated with the vehicle PRNDL indicator on the vehicle console. Also, the finger 164 includes an aperture 167 which receives and secures cable 147 associated with the vehicle transmission. The pivot member 148 is generally molded around lever 156 from a polymeric material whereby annular necked in portion 157 of lever 156 may serve to mechanically lock lever 156 in assembled relationship with pivot member body 149. The pivot member 148 also includes a pin member 168 projecting from the body 149.

The plunger 162, the remainder of the lever assembly 138 and frame 130 are substantially identical to those described in U.S. Pat. No. 4,612,820, entitled "Automatic Transmission Shift Selector Mechanism", issued Sept. 23, 1986, assigned to the assignee of the present invention, the specification of which is hereby expressly incorporated by reference. However, some of the features disclosed in the above patent will be pointed out with respect to the plunger 162, lever assembly 138 and frame 130 to further clarify the operation of gearshift assembly 110 and the park interlock system of the present invention.

The plunger 162 includes a plurality of steps 169 selected ones of which are adapted to engage with the undersurface of the arcuate sector plate member 170. The sector plate assembly is like that described in the above referenced U.S. Pat. No. 4,612,820. The sector plate member 170 includes a detent slot 171 having defined openings of varying width for park, reverse and a plurality of drive positions, as can be seen in FIG. 5.

The lever member 156 includes an outer decorative elongated hollow cylindrical member 173 encasing the upper end portion thereof and to which a palm abutting knob 172 is secured at one end. Preferably, member 173 is formed from a plastic material. The member 156 is hollow and has an elongated push rod 174 therein which is axially moveable. The top of the push rod 174 is affixed to an operating member or button 176 which protrudes from a central cavity in the knob 172. The plunger 162 is releasably secured to the push rod 174 by means of a cross pin 178 which extends through an axially elongated slot 179 in lever member 156, as seen in FIG. 9. Thus, the compression spring 160 biases the plunger 162, plunger pin 178 and rod 174 in an axial direction towards the lever upper handle.

As best seen with reference to FIGS. 3 and 10, a cam mechanism 180, pivotally mounted on portion 136 of frame 130, is coupled with the linkage 114 which, in turn, is associated with the locking slider receiving mechanism 118. The cam mechanism 180 includes a first cam member 182 and a second coupling member 184. The first and second members 182, 184 include apertures 183 and 185, respectively, to enable a pin 186 to pivotally secure members 182 and 184 to portion 136 of frame 130. Also, fastener assembly 188 adjustably secures the first and second members 182 and 184 to one another.

Figure 4:
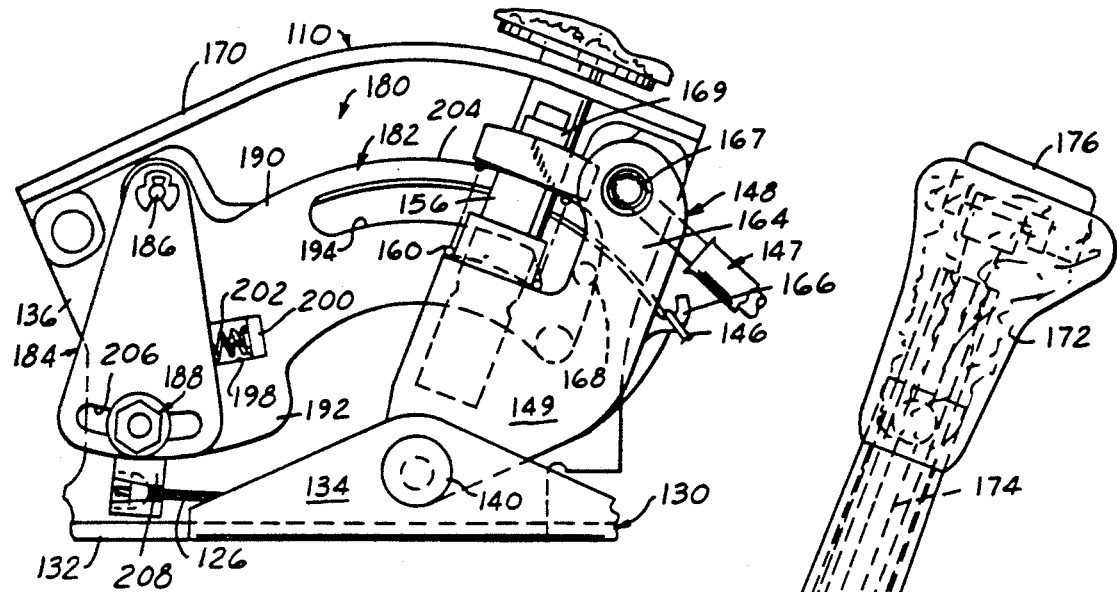
FIG. 4 is a side elevation view of a portion of the gearshift assembly of FIG. 3 with the assembly shown with the interlock released.

The first member 182 has an overall arrow shape with an arcuate shaft portion 190 and a truncated head 192. A surface 204 is provided on the upper edge of the arcuate shaft portion 190 against which the bottom surface 220 of plunger 162 is moveable to impart initial pivotal movement to the cam mechanism 180. The arcuate shaft portion 190 includes an arcuate groove 194 in major surface 195 to receive the pivot body pin 168. The arcuate groove 194 is engraved partially through the major surface 195 of shaft portion 190 and opens at the free depending end of the shaft portion 190. An inclined or beveled step 196 is formed in the raised major surface 195 of the shaft portion 190 at the free end of the arcuate groove 194 and serves as a cam surface to enable the pivot body pin member 168 to effect further pivotal movement of cam mechanism 180 as pin member 168 enters into the groove 194, as seen in FIGS. 3, 4 and 6. The sidewalls of arcuate groove 194 provide a continuing cam surface engageable by pin member 168. The truncated head portion 192 includes an arcuate first spring receiving groove 198 engraved in major surface 195 and being open at the tip of the truncated head portion 192, as seen in FIG. 7. Also, a combination stop and seat 200 is at the other end of the first spring receiving groove 198 extending from major surface 195 to provide an abutment surface and seat for spring 202.

The second coupling member 184 generally has an overall triangular shape with curved vertices. An arcuate slot 206 is formed in the second coupling member 184 near the base of the triangular shape member. A tail 208 extends from the base. The tail 208 includes a notch 212 into which a slot 210 opens. Cable 126 of the linkage 114 is designed to extend through slot 210 and includes an enlarged end fitting which is received in notch 212. The second coupling member 184 also includes a second spring receiving groove 214 in major surface 215 to enable spring 202 to position therein. A projection 216 is at the terminus of the second spring receiving groove 214 to provide a seat for centering the spring 202, as can be seen in FIG. 7. Thus, spring 202 is sandwiched between grooves 198 and 214 provided in respective members 182 and 184 and extends between seats 200 and 216.

The linkage 114 includes a cap 115 having a bore therethrough for enabling passage of the cable 126. The cap 115 includes a tang member 117 secured to pin 140 to releasably retain the cap 115 in assembled relationship with the frame 130, as seen in FIG. 6.

Turning to FIGS. 12-19, particularly FIG. 12, the receiving mechanism 118 is shown. The receiving mechanism 118 generally includes a housing 250, a moveable member 252 and a cover plate 254. Generally, the housing 250 and moveable member 252 are formed from a polymeric material and the cover plate 254 is formed from a metallic material. The cover plate 254 is designed to be secured to housing 250 in overlying relationship to the moveable member 252 so as to restrict direct access to the moveable member 252.

Figure 17:
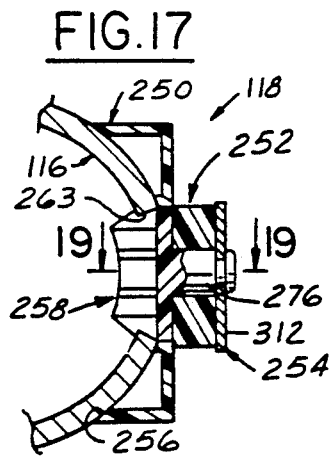
FIG. 17 is a cross-section view of the locking slider receiving device of FIG. 14, the section being taken along line 17—17 thereof.
Figure 18:
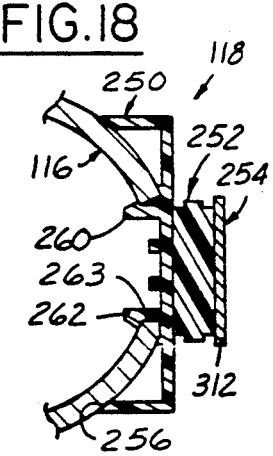
FIG. 18 is a cross-section view of the locking slider receiving device of FIG. 14, the section being taken along line 18—18 thereof.
Figure 19:
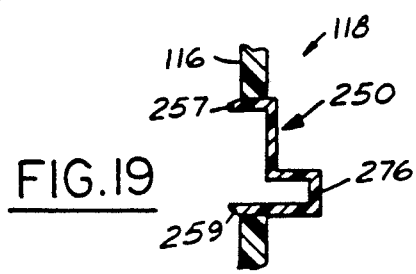
FIG. 19 is a fragmentary cross-section view of the locking slider receiving device of FIG. 14, the section being taken along line 19—19 of FIG. 12.

The housing 250 has an overall rectangular shape having an arcuate major surface 256. A retention mechanism 258 extends from the arcuate contour 256 adapted to facilitate positioning and securing of the housing to the steering column 116, (see FIG. 15). As best seen in FIGS. 17 and 18, the arcuate contour 256 abuts the steering column 116 and spaced flanges 257, 259 and spaced prongs 260 and 262 projecting outwardly from housing 250 are received within an aperture 263 provided on the steering column 116. Also, as seen in FIG. 14 the housing may have apertures 264 and 266 for receiving screws or the like to aid in fastening the housing to the steering column 116.

Figure 13:
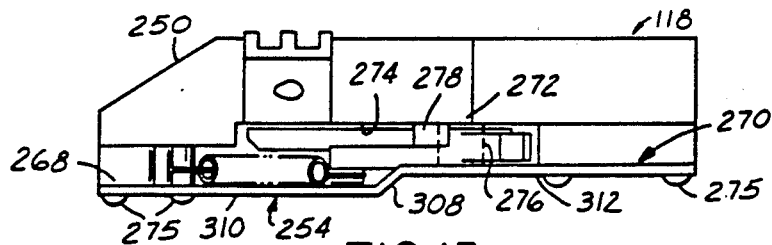
FIG. 13 is a top plan view of the assembled locking slider receiving device of FIG. 12.
Figure 15:
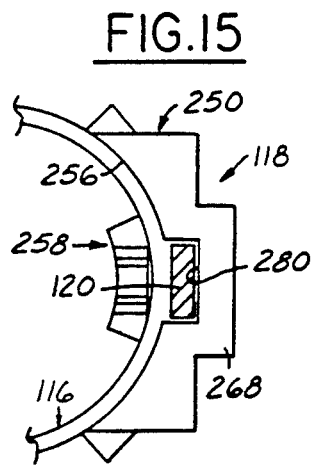
FIG. 15 is a cross-section view of the locking slider receiving device of FIG. 14, the section being taken along line 15—15 thereof.
Figure 14:
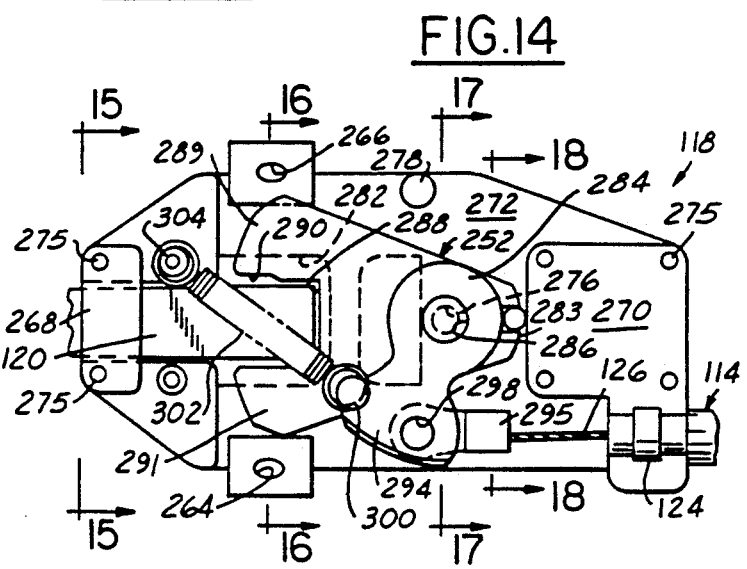
FIG. 14 is a side elevation view of the locking slider receiving device of FIG. 12 with the plate removed and showing the ignition locking slider in locking relationship therewith.
Figure 16:
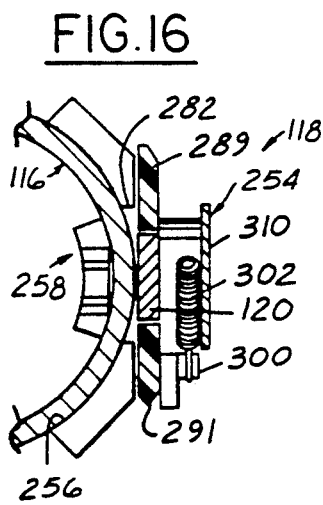
FIG. 16 is a cross-section view of the locking slider receiving device of FIG. 14, the section being taken along line 16—16 thereof.

As shown in FIGS. 13 and 14, the housing 250 includes a pair of raised portions 268 and 270 extending from the relatively planar major surface 272 of the housing 250. The raised portions 268 and 270 include a plurality of spaced posts 275 to secure the cover plate 254 to the housing 250. The posts 275 may be heat staked, compressed or the like to form heads securing the cover plate 254 to the housing 250. In between the raised portions 268 and 270 is a valley 274 having a substantially planar surface. The valley 274 provides a seat for the moveable member 252. A pivot pin 276 extends from the planar valley 274 providing a pivot for the moveable member 252. A second pin 278 extends from the valley 274 to limit movement of the moveable member 252. Also, an opening 280 is formed in the housing under the raised portion 268 to provide an entrance for the ignition locking slider 120. The opening 280 extends into the valley 274 providing an aperture 282 in the valley 274.

The moveable member 252 has an overall triangular shape with curved vertices. At the apex 283 of one of the vertices is an enlarged washer portion 284 having an aperture 286 for receiving the pivot pin 276. The washer portions 284 provide thickness to the moveable member 252 between the valley 274 and cover plate 254 to limit axial movement along pin 276 of the moveable member 252 when assembled, as seen in FIG. 13. The base of the triangular member 252 includes a cutout 288 for receiving the ignition locking slider 120 separating the other two vertices and forming legs 289 and 291. The cutout 288 includes a step 290 which provides an enlarged opening of the cutout 288. The enlarged opening including the step 290 enables the moveable member 252 to have additional clearance to accept the locking slider 120 in all ignition positions such as accessory and lock. The moveable member 252 includes a ledge portion 294 to provide securement for the end of the cable 126. The ledge portion 294 includes an aperture 298 to receive a pin from the end fitting 295 secured to cable 126. Generally, the ledge 294 is not as thick as member 252 providing a space between the ledge 294 and valley 274 to enable positioning of the end fitting 295 under the ledge 294, as illustrated in FIG. 14.

A post 300 extends outwardly from the moveable member 252 to enable securement of a coil spring 302.

The other end of coil spring 302 is secured to a post 304 on the housing 250. The spring 302 provides a biasing force against the linkage 114. In the case where the cable 126 of the linkage 114 breaks or becomes disengaged after the locking slider 120 has been moved out of engagement with the moveable member cutout 288, the biasing member 302 will pivot the member 252 towards the limiting post 278 positioning leg 291 in alignment with opening 280 prohibiting the locking slider 120 from entering into the member 252. Thus, the vehicle operator would be alerted that a linkage problem in the vehicle park interlock system has been encountered.

The cover plate 254 has an overall rectangular shape with a plurality of apertures 306 to engage with posts 275. The cover plate also includes a bend 308 dividing the cover plate into two portions 310 and 312. Portions 310 and 312 are substantially parallel to one another, divided by the bend 308. The cover plate 254 provides an envelope between it and the housing valley 274 to enable positioning and pivotal movement of the member 252 therebetween. Also, the cover plate includes a tail 316 to sandwich the linkage sheath 124 between the housing 250 and the tail 316 to secure the linkage 114 to the housing 250, as seen in FIG. 14.

During installation, the fastener 188 is initially loose thereby enabling the second coupling member 184 to move with respect to the first cam member 182. Spring 202 will operate to bias the second member 184 in a direction away from the first cam member 182. The end of the cable 126 is positioned within the slots 212 and the receiving mechanism 118 is positioned on the steering column 116. The ignition locking slider 120 is moved into cutout 288 of the receiving mechanism and the lever assembly 138 is positioned in the park position of the sector plate 170, as seen in FIG. 11. Spring 202 takes up the slack in cable 126 enabling the fastener 188 to be tightened to affix the position of the second coupling member 184 with respect to the first cam member 182. With the members 182 and 184 secured in position with respect to one another and the fastener 188 tightened the linkage 114 is in a proper position to provide movement between the gearshift assembly 110 and receiving mechanism 118.

When the ignition system is in a lock or accessory position, the locking slider 120 is engaged with the opening 280 and cutout 288, as seen in FIG. 12A. At this time, the member 252 is prohibited from moving which, in turn, prohibits the cam mechanism 180 from moving, which prohibits the button 176 from being pushed axially downward to release the lever assembly 138 from the park position. Thus, the transmission is locked when the vehicle ignition system is in a lock or an accessory position.

Once the ignition system is turned to off, to on or to start, the locking slider 120 is disengaged from the cutout 288 enabling member 252 to pivot, as seen in FIG. 12A. The button 176 is then pushed axially downward such that the push rod 174 moves the plunger 162 against spring 160 and cam surface 204 to enable pivotal movement of the lever assembly 138 in the sector plate 170. As the plunger 162 moves downwardly, the bottom surface 220 of the plunger contacts the curved cam surface 204 of the shaft portion 190 of cam member 182. As the shaft portion 190 is forced downward, as illustrated in FIGS. 4 and 6, the pin member 168, extending from the body 149 of the pivotal member 148, is provided to be in alignment with the shaft portion arcuate groove 194, see FIG. 4. This movement causes leg 289 of member 252 to pivot in alignment with opening 280 blocking the opening. The lever assembly may then be pivoted into a reverse or a drive position. Also, the pivoting of leg 289 into alignment with opening 280 prohibits the vehicle ignition system from being locked as long as the vehicle is in a gear other than park. Thus, the driver must place the lever assembly into the park position and release the button 176 before the vehicle ignition can be locked to enable removal of the key.

As the lever assembly 138 is pivoted from the park position to a reverse or one of the drive positions, the pin 168 enters into the arcuate groove 194 maintaining the cam mechanism 180 in the down position, see FIGS. 6, 7 and 9. The movement of the first cam member 182 and the second coupling member 184 affects the movement of the cable 126 within the linkage 114 which, in turn, affects the receiving mechanism 118, as explained herein. Also, as the lever mechanism 138 is pivoted, finger member 164 pivots which provides movement of the cables 146 and 147 which activates the vehicle's PRNDL indicator and transmission. Thus, as the button 176 is pushed and the lever mechanism 138 pivoted, the axial and pivotal movements are active affecting the function of the park interlock system 100, PRNDL indicator and transmission eliminating lost motion in the gearshift mechanism 110. When the lever assembly 138 is returned to the park position after being in a reverse or drive positions, the pin member 168 disengages from arcuate groove 194, spring 160 biases against plunger 162 forcing the plunger step into the park detent slot in the sector plate 170 locking the lever in park once the locking slider 120 is engaged with receiving mechanism 118. Thus, the present invention provides the vehicle with a fail safe system requiring the vehicle to be in park for removal of the key from the ignition tumbler 122.

While the above detailed description discloses the preferred embodiment of the present invention, it will be understood that modifications, variations and alterations may be made to the present invention without deviating from the scope and fair meaning of the subjoined claims.

What is claimed is:

1. A shift selector interlock system for a motor vehicle automatic transmission comprising:

a shift lever mechanism including a support means, a selector lever with a handle end and a pivot end, said lever pivot end mounted on said support means for pivotal movement, a selector plate fixed to said support means and having a longitudinally extending detent slot receiving said lever therethrough, a plunger supported on said lever for limited axial movement thereon, resilient means biasing said plunger axially toward said lever handle end, means on said handle end operative to move said plunger axially toward said lever pivot end;

actuating means provided on said support means;

retaining means adapted for receiving a locking slider from an ignition mechanism of the motor vehicle such that when the ignition mechanism is in a locked position said locking slider is adapted to engage with said retaining means;

linkage means extending between and interconnecting said actuating means and said retaining means, said actuating means providing movement to said linkage means in response to axial movement of said plunger, whereby when said locking slider engages with said retaining means said plunger is prevented by cam means from moving axially thereby locking said lever in position and when the ignition mechanism is in an on position said locking slider is adapted to disengage with said retaining means so that said plunger may axially move toward said pivot end moving said cam means thereby allowing pivotal movement of said lever;

wherein said cam means further comprising a first cam member and a second coupling member both pivotally secured to said support means;

a biasing member is associated with said first cam member and said second coupling member; and wherein said linkage means is coupled with said second coupling member so that said biasing member provides self-adjustment of said first cam member and said linkage means by moving said second coupling member in a direction away from said first cam member, whereby upon fastener means adjustably securing said second coupling member to said first cam member slack is taken up in said linkage means.

2. The system according to claim 1 wherein said plunger being associated with said detent slot for prohibiting movement of said lever when the ignition mechanism is in a locked position.

3. A shift selector mechanism for use with a motor vehicle automatic transmission comprising:

support means, a selector lever provided with a handle end and a pivot end, said lever pivot end mounted on said support means for pivotal movement about a transverse pivot axis, an arcuate shaped sector plate fixed to said support means, said sector plate having a longitudinally extending detent slot receiving said lever therethrough, said slot including a series of interconnected notches, a plunger supported on said lever for limited axial travel thereon, resilient means biasing said plunger axially toward said lever, means on said lever handle end operative to move said plunger axially toward said lever pivot end;

cam means provided on said support means, said cam means being moveable by said plunger;

locking means for releasably locking said cam means against movement whereby movement of said plunger is resisted;

a member extending from said lever pivot end, said member adapted to be coupled with cable means associated with a transmission of the motor vehicle for providing movement to said cable means in response to pivotal movement of said lever wherein said shift selector mechanism substantially eliminating lost motion during movement of said shift selector; and wherein said cam means is comprised of a first cam member and a second coupling member, said first cam member having an overall arrow shape with a truncated head and an arcuate shaft portion, said second coupling member having an overall triangular shape with rounded vertices, and said first cam member and said second coupling member pivotally secured to said support means.

4. The shift selector according to claim 3 wherein said first cam member and said second coupling member both including a groove and a stop at one end of said groove, and a biasing member abutting said stop and biasing said first cam member with respect to said second coupling member;

said second coupling member includes an arcuate slot therethrough enabling passage of a fastener to adjustably secure said first cam member with said second coupling member;

said second coupling member triangular shape defining a base having a tail portion extending therefrom, said tail portion including means adapted for receiving linkage means, said linkage means extending between said coupling member and retaining means, said retaining means adapted for receiving a locking slider from an ignition mechanism of the motor vehicle, such that when the ignition mechanism is in a locked position said locking slider is adapted to engage with said retaining means; and said linkage means is coupled with said second coupling member tail portion so that said biasing member provides self-adjustment of said first cam member and said linkage means by moving said second coupling member in a direction away from said first cam member, whereby upon said fastener adjustably securing said second coupling member to said first cam member slack is taken up in said linkage means.

5. The shift selector according to claim 3 wherein said first cam member including a longitudinal arcuate groove on said first cam member shaft portion.

6. The shift selector according to claim 5 wherein said lever pivot end includes a pin member extending therefrom adapted to move in said first cam member longitudinal arcuate groove.

7. The shift selector according to claim 5 wherein said first cam member longitudinal arcuate groove is open at a free end of said first cam member shaft portion.

8. The shift selector according to claim 3 further comprising a pivot member including a body, a neck extending from said body, a bore in said neck and body for receiving said lever pivot end, a pair of ears extending from said body and opposing one another, each said ear having an aperture for receiving a pivot to secure said lever to said support means, a finger member extending from said body and including a means for coupling said cable means to the transmission, and a pin member extending from said body and adapted to engage a cam surface portion of an arcuate groove formed in said first cam member arcuate shaft portion.

* * * * *